United States Patent
Atta et al.

(10) Patent No.: US 9,850,420 B1
(45) Date of Patent: Dec. 26, 2017

(54) COMPOSITION AND METHOD FOR ENHANCED OIL RECOVERY

(71) Applicant: KING SAUD UNIVERSITY, Riyadh (SA)

(72) Inventors: Ayman Mohamamdy Atta, Riyadh (SA); Mahmood Mohammed Abdullah, Riyadh (SA); Hamad Abdulla Al-Lohedan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/603,378

(22) Filed: May 23, 2017

(51) Int. Cl.
*C09K 8/58* (2006.01)
*C09K 8/584* (2006.01)
*E21B 43/16* (2006.01)

(52) U.S. Cl.
CPC ............ *C09K 8/58* (2013.01); *C09K 8/584* (2013.01); *E21B 43/16* (2013.01); *C09K 2208/10* (2013.01)

(58) Field of Classification Search
CPC ...... C09K 8/58; C09K 8/584; C09K 2208/10; E21B 43/16
See application file for complete search history.

(56) References Cited

U.S. PATENT DOCUMENTS

| | | |
|---|---|---|
| 7,547,347 B2 | 6/2009 | Yang et al. |
| 9,468,902 B1 | 10/2016 | Atta et al. |
| 2012/0034129 A1 | 2/2012 | Suh et al. |
| 2013/0165353 A1* | 6/2013 | Mazyar ............ B82Y 30/00 507/219 |
| 2013/0221289 A1 | 8/2013 | Arce Arce et al. |
| 2014/0070139 A1 | 3/2014 | Giannelis et al. |
| 2014/0216730 A1* | 8/2014 | Ersoz ............ G01V 1/42 166/250.1 |
| 2014/0228258 A1* | 8/2014 | Mahoney ............ C09K 8/805 507/219 |
| 2016/0137767 A1* | 5/2016 | Farrand ............ C08F 2/14 524/547 |

OTHER PUBLICATIONS

Yuan et al, Poly(ionic liquid)s: Polymers expanding classical property profiles, Polymer 52 (2011) 1469-1482.*

(Continued)

*Primary Examiner* — Alicia Bland
(74) *Attorney, Agent, or Firm* — Richard C. Litman

(57) ABSTRACT

The composition for enhanced oil recovery includes metal oxide or carbonate nanoparticles capped or encapsulated by a water soluble poly(ionic liquid) (PIL). The nanoparticles may be, e.g., $CaCO_3$, $TiO_2$, $Cu_2O.Fe_3O_4$, or $ZrO_2$. The poly(ionic liquid) may be a copolymer of 2-acrylamido-2-methyl-1-propanesulfonic acid (AMPS) with N-isopropyl acrylamide, N-vinyl pyrrolidone, methacrylic acid, or acrylamide. The composition is made by synthesizing the metal oxide or carbonate nanoparticles in the presence of the PIL. The resulting nanocomposite or nanomaterial alters the wettability of carbonate rock in a carbonate reservoir, releasing asphaltenic crude oil from the surface of the carbonate rock and replacing oil in the pores of the rock, thereby enhancing secondary and tertiary oil recovery.

13 Claims, 20 Drawing Sheets

(56) References Cited

OTHER PUBLICATIONS

Kedir et al., "Nanoparticles for Enhanced Oil Recovery: Phase Transition of Aluminum-Cross-Linked Partially Hydrolyzed Polyacrylamide under Low Salinity Conditions by Rheology and Nuclear Magnetic Resonance", Energy & Fuels, 28.5, pp. 2948-2958 (2014).

Atta et al., "Dipoles poly (ionic liquids) based on 2-acrylamido-2-methylpropane sulfonic acid-co-hydroxyethyl methacrylate for demulsification of crude oil water emulsions", Journal of Molecular Liquids, 222, (2016), 680-690.

Abdullah et al., Synthesis of novel water soluble poly (ionic liquids) based on quaternary ammonium acrylamidomethyl propane sulfonate for enhanced oil recovery, Journal of Molecular Liquids, 233 (May 2017) 508-516.

Atta et al., "Synthesis of zinc oxide nanocomposites using poly (ionic liquids) based on quarternary ammonium acrylamidomethyl propane sulfonate for water treatment", Journal of Molecular Liquids, 236 (Jun. 2017), 38-47.

\* cited by examiner

Blank

AMPSA/MAA 5000 ppm

AMPSA/VP 5000 ppm

TiO₂

CaCO₃

ZrO₂

5000 ppm 2500 ppm 1500 ppm 500 ppm

COMPOSITION AND METHOD FOR ENHANCED OIL RECOVERY

BACKGROUND OF THE INVENTION

1. Field of the Invention

The present invention relates to oil field techniques, and particularly to a composition and method for enhanced oil recovery, especially from carbonate reservoirs, that includes metal oxide or carbonate nanoparticles capped or encapsulated by a water soluble poly(ionic liquid) and used as a surfactant when flooding wells.

2. Description of the Related Art

The U.S. Department of Energy has estimated that only about 10% of an oil reservoir's capacity is recovered by primary processes (those that rely on natural pressure and gravity to push oil into the well bore or that rely on pumps). In order to more fully exploit this scarce natural resource, producers resort to secondary processes (injection of water or gas to drive oil into the well bore, which may result in recovery of 20 to 40% of the reservoir's capacity. Because of the great demand for oil and petroleum products, producers are attempting to develop tertiary processes in hopes of delivering 30 to 60% of the reservoir's capacity. Tertiary processes include thermal recovery by the injection of steam; gas injection of natural gas, nitrogen, or carbon dioxide; and chemical injection of long chain polymers and/or surfactants to lower the surface tension that prevents oil droplets from moving through the reservoir.

It has been suggested that nanoparticles or nanomaterials might be used for enhanced oil recovery. However, nanomaterials have high economic cost and are adversely affected by the harsh conditions in an oil reservoir, including high salinity and high temperatures, which may lead to aggregation, precipitation, and efficiency losses. Hence, the search for new compositions and new techniques to maximize recovery of an oil reservoir's capacity is never-ending.

Thus, a composition and method for enhanced oil recovery solving the aforementioned problems is desired.

SUMMARY OF THE INVENTION

The composition for enhanced oil recovery includes metal oxide or carbonate nanoparticles capped or encapsulated by a water soluble poly(ionic liquid) (PIL). The nanoparticles may be, e.g., $CaCO_3$, $TiO_2$, $Cu_2O.Fe_3O_4$, or $ZrO_2$. The poly(ionic liquid) may be a copolymer of 2-acrylamido-2-methyl-1-propanesulfonic acid (AMPS or AMPSA) with N-isopropyl acrylamide, N-vinyl pyrrolidone, methacrylic acid, or acrylamide. The composition is made by synthesizing the metal oxide or carbonate nanoparticles in the presence of the PIL. The resulting nanocomposite or nanomaterial alters the wettability of carbonate rock in a carbonate reservoir, releasing asphaltenic crude oil from the surface of the carbonate rock and replacing oil in the pores of the rock, thereby enhancing secondary and tertiary oil recovery. The method for enhanced oil recovery includes adding the composition to seawater used to flood a carbonate reservoir for secondary or tertiary oil recovery.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
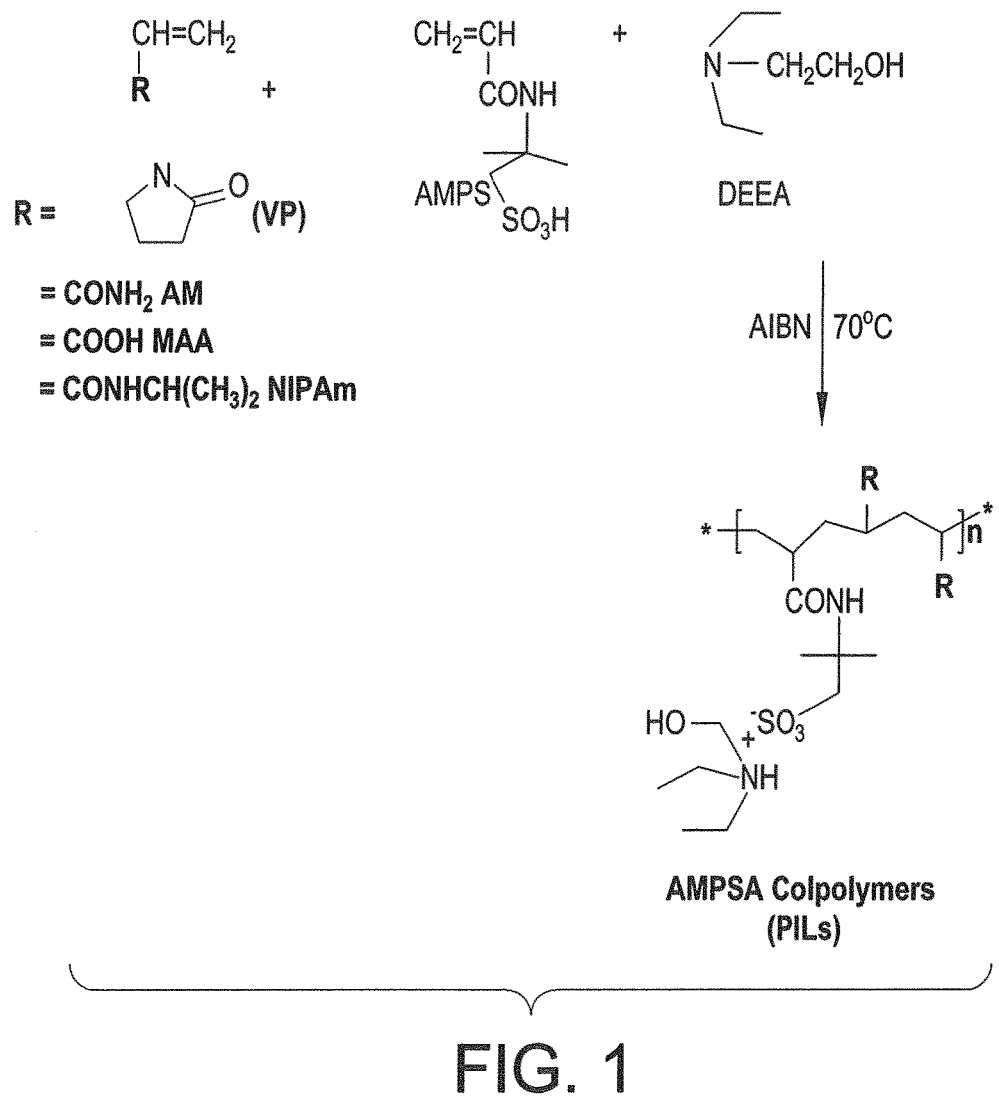
FIG. 1 is a reaction scheme for the synthesis of poly(ionic liquids) (PILS) used for making a composition for enhanced oil recovery.

The composition for enhanced oil recovery includes metal oxide or carbonate nanoparticles capped or encapsulated by a water soluble poly(ionic liquid) (PIL). The nanoparticles may be, e.g., $CaCO_3$, $TiO_2$, $Cu_2O.Fe_3O_4$, or $ZrO_2$. The poly(ionic liquid) may be a copolymer of 2-acrylamido-2-methyl-1-propanesulfonic acid (AMPS or AMPSA) with N-isopropyl acrylamide, N-vinyl pyrrolidone, methacrylic acid, or acrylamide. The composition is made by synthesizing the metal oxide or carbonate nanoparticles in the presence of the PIL. The resulting nanocomposite or nanomaterial alters the wettability of carbonate rock in a carbonate reservoir, releasing asphaltenic crude oil from the surface of the carbonate rock and replacing oil in the pores of the rock, thereby enhancing secondary and tertiary oil recovery. The method for enhanced oil recovery includes adding the composition to seawater used to flood a carbonate reservoir for secondary or tertiary oil recovery.

The present compositions will be better understood by reference to the following experimental data, including the synthesis and testing of various examples.

In the following, solutions of titanium tetrachloride ($TiCl_4$), calcium hydroxide ($Ca(OH)_2$), ammonium bicarbonate ($NH_4HCO_3$), anhydrous ferric chloride, sodium sulfite, cupric chloride ($CuCl_2.2H_2O$), zirconium sulfate ($Zr(SO_4)_2$) and sodium hydroxide are reagents used to prepare metal oxide and carbonate nanoparticles. 2-Acrylamido-2-methyl-1-propanesulfonic acid (AMPS) (the acronyms AMPS and AMPSA are used interchangeably to refer to the same compound), N-isopropyl acrylamide (NIPAm), acrylonitrile (AN), N-vinyl pyrrolidone (VP), acrylic acid (AA), methacrylic acid (MAA), diethyl ethanolamine (DEEA) and acrylamide (AM)) monomers were obtained from Sigma-Aldrich Chemical Co. and used to prepare PILs. Ammonium persulfate (APS) and 2,2-azobisisobutyronitrile (AIBN) were used as radical initiators to prepare PILs.

Heavy Arabian crude oil (19.3 API) was used as oil phase. Its water and asphaltene contents were 0.145 wt % and 10 wt % respectively. Sea water collected from the Arabian Gulf was used as aqueous phase to dilute the PILs and for displacement and contact angle measurements.

The main characteristics of the limestone material can be summarized as: mainly calcite (94 mole %), small amounts of Al and Si (0.86 and 1.37 mole %, respectively), which indicated low clay content. One of the tested cores contained about 3.7 mole % iron, but other cores did not contain iron. Permeability in the range of 8-30 mD. and BET N2-surface area was 0.18 $m^2$/g.

The chemical structure of the PIL was confirmed by $^1H$- and $^{13}CNMR$ analyses that recorded on a 400 MHz Bruker Avance DRX-400 spectrometer.

The morphology of nanomaterials was observed under Transmission Electron Microscope (TEM, JEOL JEM-2100 F) electron microscope. High resolution HR-TEM images recorded at an acceleration voltage of 200 kv. The TEM sample was prepared by placing a dilute drop of aqueous particles onto the copper grids and allowing it to dry.

The crystal analysis of nanomaterials was performed using a Bruker D2 Phaser X-ray powder diffractometer (30 kV, 10 mA) using Cu anode (k=0.15406 nm) at 25° C. The patterns were collected in the 2 [theta] range of 4-70° with step size of 0.02° and scan rate of 1 s.

Zeta potentials of nanomaterials were determined using Laser Zeta meter Malvern Instruments (Model Zetasizer 2000) in aqueous solution in the presence of KCl (0.01 M) at different pH solutions.

The thermal stability of nanomaterials were evaluated using thermogravimetric analysis (TGA; TGA-50 SHIMADZU at flow rate 50 ml/min and heating rate of 20° C./min).

The dispersion stability, polydispersity index (PDI) and surface charges (zeta potential; mV) of nanomaterials were determined by using dynamic light scattering (DLS; Laser Zeta meter Malvern Instruments; Model Zetasizer 2000).

Nanomaterials capped with PILs sea water solutions of different concentrations were prepared and used to measure the rock wettability using contact angle measurement technique. This was conducted on cut and polished substrates of the rock samples at reservoir conditions of 2000 psi and 60° C. The impact of ionic composition of aqueous phases on rock samples surface charge can be used to explain rock wettability. Hence, Zeta potential measurements were conducted by dispersing certain amount of pulverized particles of rock sample in sea water, and different concentrations of nanomaterials capped with PILs solutions at 60° C. A small representative quantity of each dispersed solution was used to perform the test.

Example 1

Synthesis of Poly (Ionic Liquid)

A mixture of equal molar ratios (1:1 mol %) of AMPS and VP, NIPAm, MAA, AM or AA (6 mmol of each monomer) was stirred with 6 mmol of DEEA under nitrogen atmosphere at 10° C. in a flask. The mixing was carried out for 5 hrs to complete dissolution of AMPS in VP (or NIPAm, MAA, AM or AA) and DEEA solutions. A transparent solution was obtained with yield of 99%, which indicates the formation of quaternized DEEA organic salt with VP (or NIPAm, MAA, AM or AA) and AMPS monomers. ABIN initiator (0.08 mmol) was added to the reaction mixture under nitrogen bubbling, and the mixture was heated to 70° C. for 24 hrs. The viscosity of the mixture was increased, and a transparent, light yellow mixture was precipitated from acetone into cold diethyl ether (dry ice/acetone bath) and collected after filtration. The viscous oil was dried under vacuum at 40° C. to remove any residual volatile materials in order to obtain AMPSA/VP, AMPSA/NIPAm, AMPSA/MAA) or AMPSA/AA polymer with high yield (98.7%).

Example 2

Preparation of Modified Calcium Carbonate Nanoparticles

An aqueous solution of $Ca(OH)_2$ (2 g) was vigorously stirred in 100 ml of deionized water (DIW) for 30 min in the presence of a PIL (1-5 g) prepared as described above and a nitrogen inlet. Ammonium bicarbonate was heated in a closed flask and connected to a reaction flask containing the calcium hydroxide solution to produce a $CO_2$ bubble stream through the reaction solution until the pH of the solution reached 7. The resulting calcium carbonate solution undergoes centrifuging at 10000 rpm for 30 min to separate the nanomaterials, which are washed several times with ethanol and separated with an ultracentrifuge.

Example 3

Synthesis of $Cu_2O.2Fe_3O_4$ Capped with PIL $FeCl_3$ (13.4-23 g) was dissolved with 100 mL distilled water, and charged into a 500 mL three-necked flask. A solution of 5-75 mL of $Na_2SO_3$ (4.8-14.5 wt %) was added to the reaction mixture, followed by bubbling with $N_2$ and stirring for 1 h. The reaction mixture was heated at temperatures ranging from 40 to 65° C. A sample of $CuCl_2.2H_2O$ (1.75-7.4 g) was dissolved in 50 mL water and was added to the reaction mixture in the presence a PIL (1-10 g). A solution of (1-2 M) of NaOH 100 mL in water was added dropwise to the reaction mixture during 1 h. Ammonium hydroxide (4-8 g) dissolved in 50 mL aqueous solution was added to the reaction mixture at the same time with a solution of (1-2 M) of NaOH 100 mL in water, and the temperature was maintained at a temperature from 40 to 65° C. for 2-10 h. The suspended brownish black solution was centrifuged at 15000 rpm for 10 min. The precipitate obtained was washed several times with distilled water to remove NaCl and other salts from the solvent. The $Cu_2O.2Fe_3O_4$ nanoparticles were at last dispersed in distilled water, and adjusted (pH 2) with 2 mol/L HCl for further experiments. The yield percentage of the reaction ranged from 85 to 95%.

Example 4

Synthesis of Titanium Dioxide ($TiO_2$) Nanoparticles

The formation of $TiO_2$ nanoparticles can be obtained from $TiCl_4$ at low temperature in the presence of alcohol, HCl and PILs complex mixtures to prevent the formation of orthotitanic acid that releases large amounts of heat when $TiCl_4$ directly solubilized in water, and thus prevents the homogeneous precipitation of $TiO_2$ particles. In this respect, a mixture of HCl and water, having different concentrations ranged from 1 to 8 mol/L, for example (volume ratio of 1:19, 36% HCl: $H_2O$) were prepared. PILs having different concentrations of PILs in alcohol ranged from 1 to 30 Wt % were prepared. The alcohols are 2-propanol, ethanol and methanol. PILs solutions in alcohol were mixed with HCl aqueous solution at ice-cooled temperatures with vigorous stirring. The pure titanium tetrachloride (10 mL) was added dropwise to 500 mL of hydrochloric acid aqueous solutions and 500 mL of PILs with alcohol to obtain $TiCl_4$ solution (1.0 mol/L). The mixture was heated at a rate of 2° C./min to obtain the reaction temperature ranged from ~40° C. to 90° C., depending on the type of alcohol and the alcohol: water ratio. The transparent solution became turbid and white at a certain temperature, indicating the formation of $TiO_2$ particles. The reaction mixture was aged at a constant temperature for different time intervals ranged 30 minute to 24 h. The $TiO_2$ particles were separated by centrifuge and then washed in alcohol and water several times.

Example 5

Synthesis of Zirconium Dioxide ($ZrO_2$) Nanoparticles $Zr(SO4)_2$ (1 mmol) was mixed with benzyl alcohol (2 mmol) to form a gel. Sodium lauryl sulfate (2 mmol) was added to the reaction mixture under vigorous stirring for 1 h. The product was dried at 200° C. for 5 h. The powder was calcined at 600° C. for 5 h to produce $ZrO_2$ nanoparticles. $ZrO_2$ (2 g) was added to reaction solution of polyvinylpyrrolidone (1 g dissolved in 100 ml (85:15) of EtOH:Water) and PILs (1-10 g) under vigorous stirring for 24 h. The solid powder was separated using ultracentrifuge at 9000 rpm and dried at room temperature.

Figure 2:
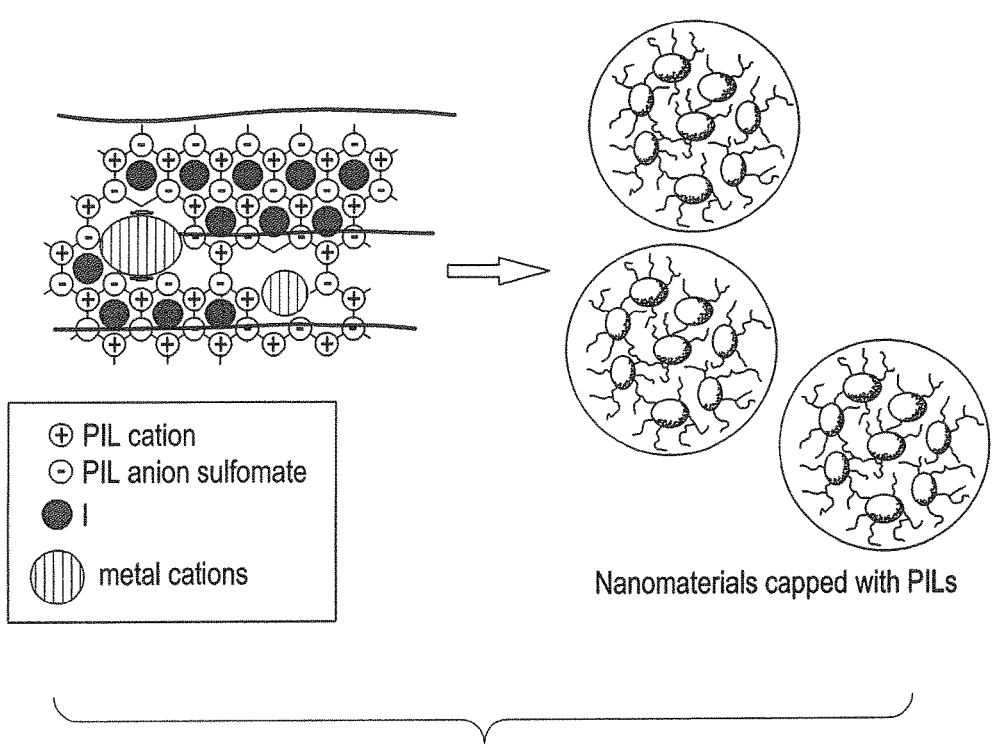
FIG. 2 is a schematic diagram illustrating mixing metal oxide or carbonate nanoparticles with an AMPSA copolymer during synthesis and the structure of the resulting composition for enhanced oil recovery in which the nanoparticles are encapsulated or capped within the PIL.

The quaternization of DEA with AMPS polymers succeeded to prepare new PILs. In the present composition, AMPS is selected to prepare copolymers with NIPAm, VP, AM, MAA and AA monomers that have great efficacy to act as stabilizing, capping and reducing agent. The scheme of copolymerization of quaternized EDA with AMPS copolymers is represented in FIG. 1. The solubility test of the prepared PILs confirms their complete solubility in water and seawater without precipitation or cloudiness at elevated temperatures. This proves that thermal and salt sensitivity of AMPS, MAA, AAm and VP are inhibited, with the formation of organic salts rather than formation of polyelectrolyte. It is expected that the formation of AMPSA copolymers have great tendency to form nanomaterials, as illustrated in FIG. 2. It is proposed that the PIL have great tendency to surround the metal cations more than IL monomers into flexible network by polar interactions between cations and negative anion of AMPSA copolymers chains to produce stable hydrosol.

Example 6

$^1$H NMR Characterization of Sample AMPSA Copolymers

Figure 3A:
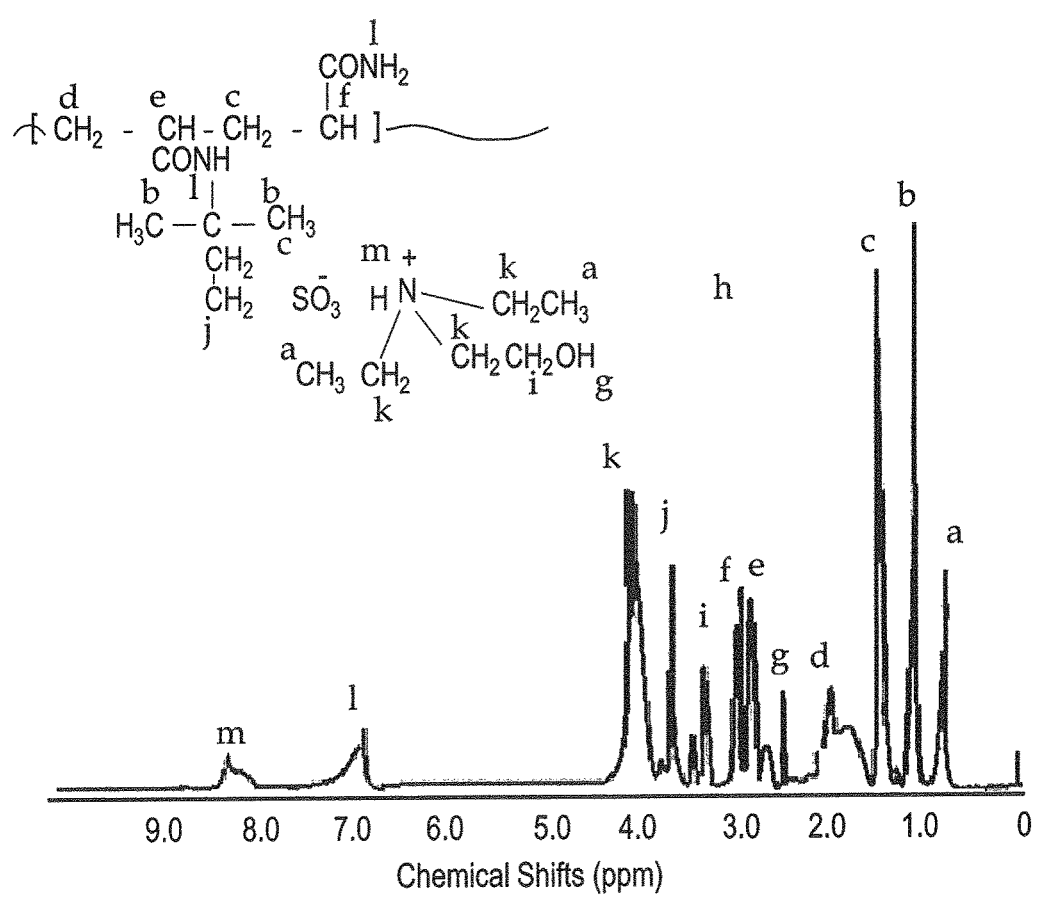
FIGS. 3A, 3B, and 3C are the 1H NMR spectra of an AMPSA/acrylamide (AM) copolymer, an AMPSA/methacrylic acid (MAA) copolymer, and an AMPSA/N-vinyl pyrrolidone (VP) copolymer, respectively.
Figure 3B:
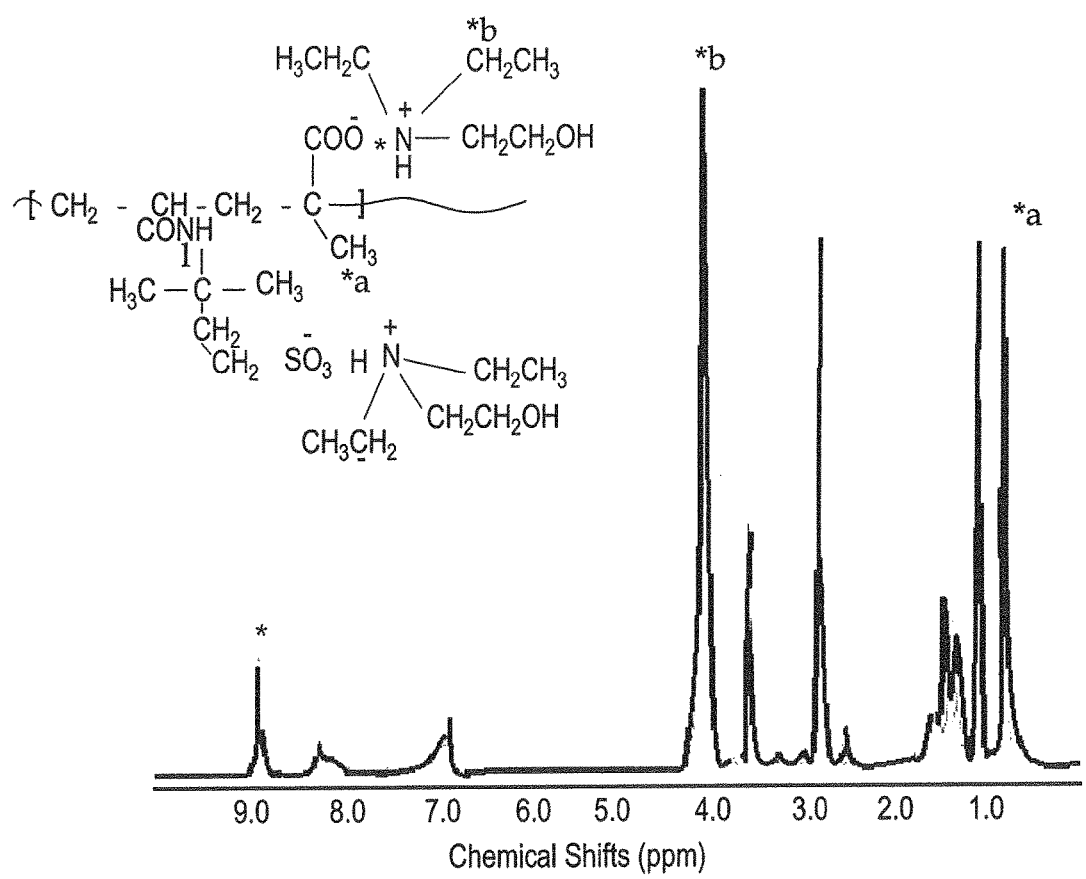
Figure 3C:
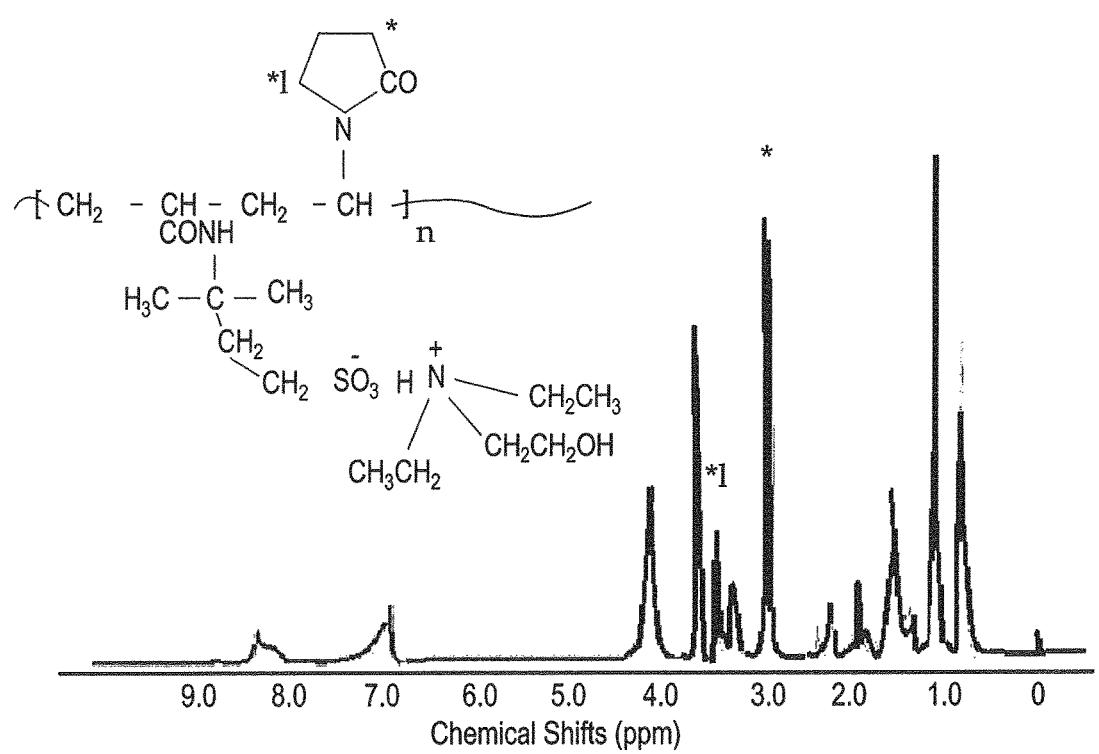

The chemical structures of the prepared AMPSA PILs were determined from $^1$H NMR spectra presented in FIGS. 3A, 3B, and 3C for an AMPSA/acrylamide (AM) copolymer, an AMPSA/methacrylic acid (MAA) copolymer, and an AMPSA/N-vinyl pyrrolidone (VP) copolymer, respectively. The expected chemical structures are represented on the spectra combined with their representative peaks. The appearance of a broad peak at 8.3 ppm confirms the de-shielding proton of the quaternized amine groups of DEA with sulfonate group in all $^1$HNMR spectra. Moreover, the appearance of a new peak at 9.1 ppm in FIG. 3B confirms the quaternization of DEA amine groups with carboxylic groups of MAA for the AMPSA/MAA polymer. The increment of the peak integration at 4.1 ppm, attributed to methylene group protons of $+N-CH_2$, further elucidates the quaternization of amine with sulfonate and carboxylate groups of AMPS/MAA polymer. The appearance of new peaks at 3.1 and 3.7 ppm in FIG. 3C, attributed to methylene groups of VP, indicate the incorporation of VP into the chemical structure of AMPSA/VP without degradation or hydrolysis by the sulfonate group of AMPS. The disappearance of sulfonate and carboxylate groups peaks above 10 ppm shows the quaternization of amine groups of DEA with all sulfonate groups of the prepared PILs.

Example 7

Characterization of $CaCO_3$ Nanomaterials Capped with PILs

The present work tends to form $CaCO_3$ nanoparticles modified with PIL from a water-ethanol solution of $Ca(OH)_2$ and $CO_2$ gas that is produced from decomposition of ammonium carbonate or bicarbonate as described in Example 2. Different concentrations of PILs were used as capping agent to produce capped $CaCO_3$ nanoparticles. The formation of $CaCO_3$ nanoparticles is a continuous process, in which the size of initially formed $CaCO_3$ nanoparticles was capped with PILs to control the nanomaterial sizes. The formation mechanism of the capping of calcium carbonate by PILs could be postulated due to chemical or physical adsorption of positively charged Ca cations with negative charges of PILs and to negatively charged carbonate anion with positive charges of PILs on the surface of the PILs. The dipole-dipole interactions between oxygen of calcium carbonate and amide groups of PILs are expected to form physical capping of PILs on the calcium carbonate surfaces. It was expected that the particle sizes could be affected by the type of capping agent and lack of decomposed gas ($NH_3$, $CO_2$, $H_2O$) from $NH_4HCO_3$ at the beginning of synthesis.

Figure 4:
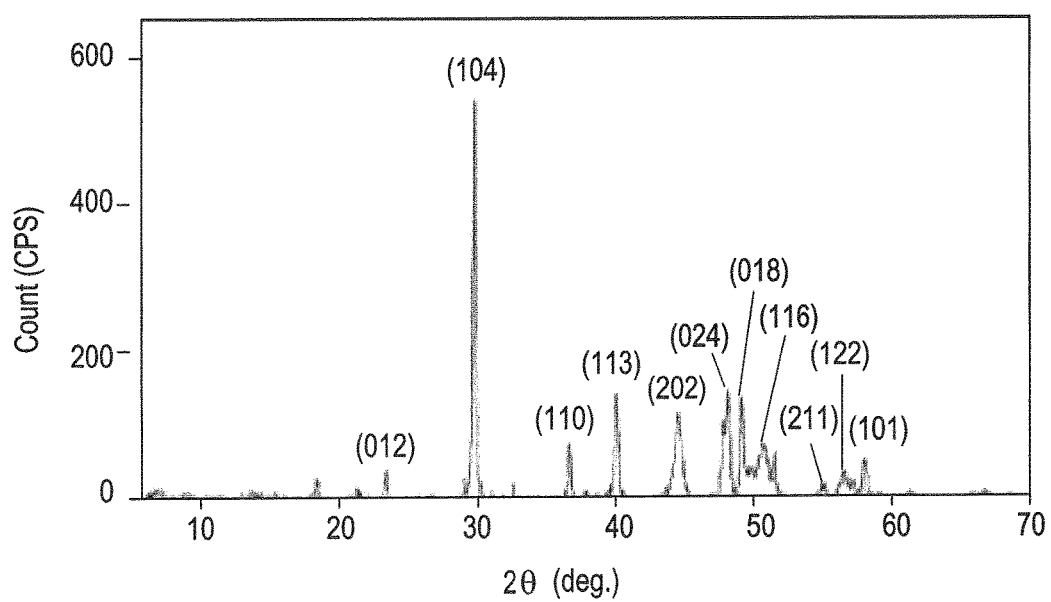
FIG. 4 is an x-ray diffractogram (XRD) of calcium carbonate nanoparticles capped by an AMPSA/VP copolymer.
Figure 5A:
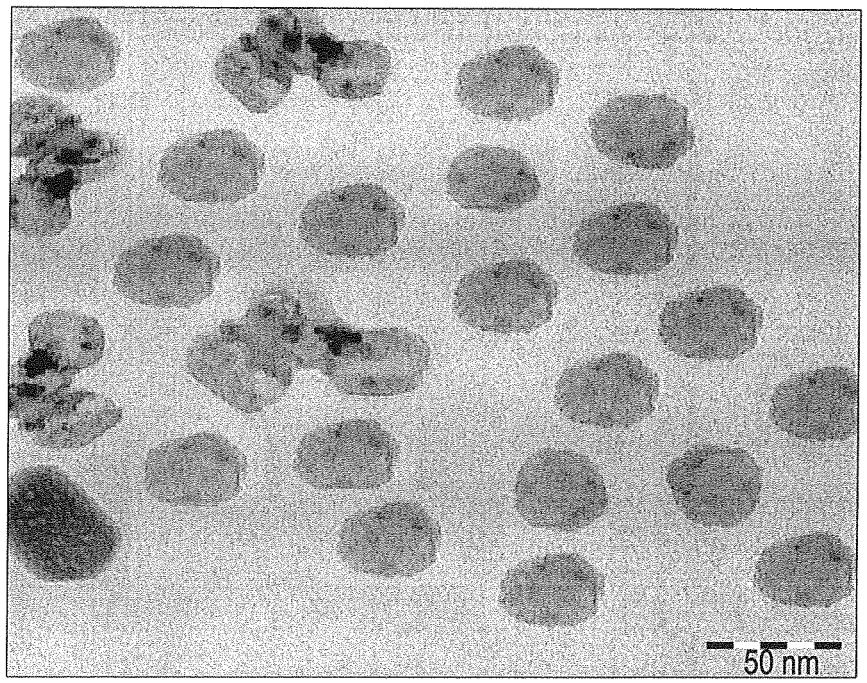
FIGS. 5A and 5B are TEM micrographs of $CaCO_3$ nanoparticles capped with 1 g of AMPSA/VP copolymer and capped with 2 g of AMPSA/MAA copolymer, respectively.
Figure 5B:
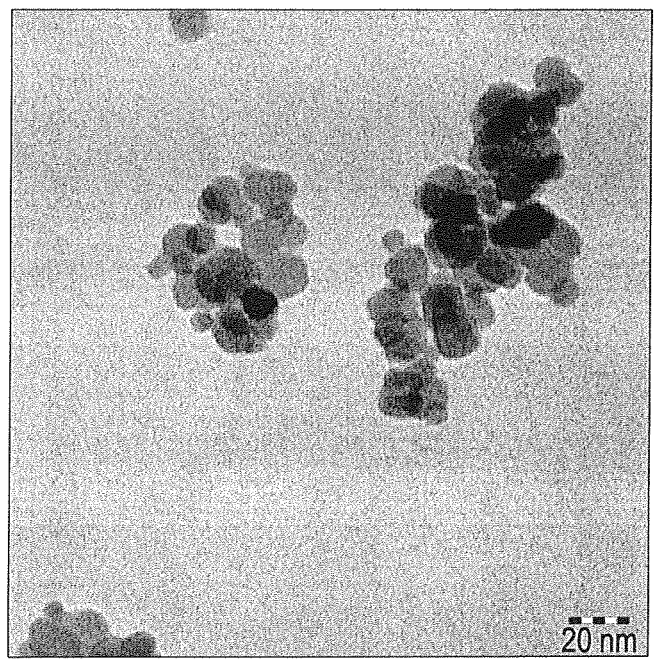
Figure 5C:
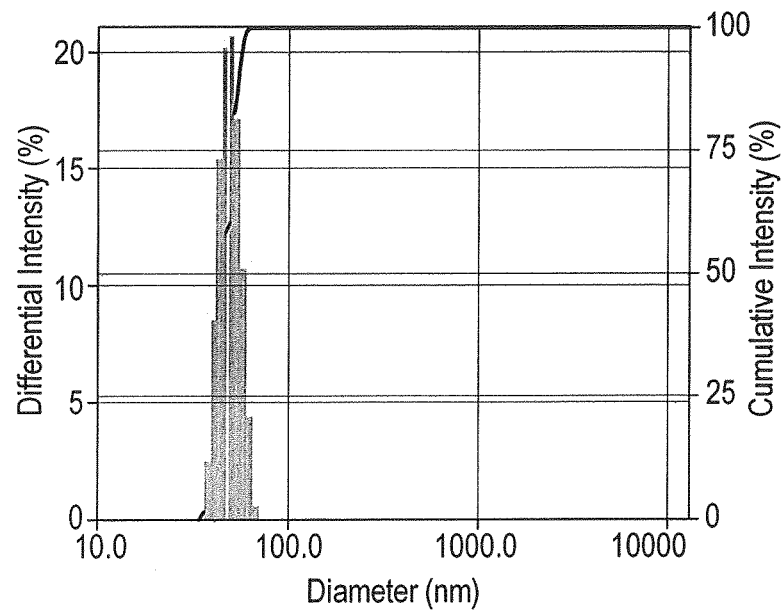
FIGS. 5C and 5D are dynamic light scattering (DLS) plots of particle size distribution of the nanomaterials of FIGS. 5A and 5B, respectively.
Figure 5D:
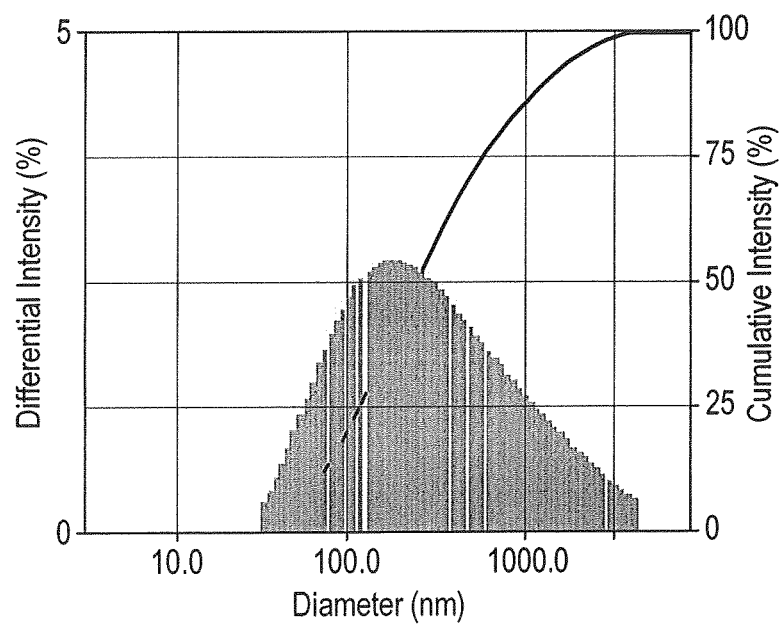

XRD analysis was used to estimate the chemical and crystal structure of the capped $CaCO_3$ with PILs. The XRD diffractograms of CaCO3 capped with AMPSA/VP is represented in FIG. 4. That confirms that $CaCO_3$ was formed without any contaminates of other calcium salts. The XRD diffraction patterns showed the $CaCO_3$ crystals can be formed, as well as different salts, such as calcite (β-CaCO3), aragonite (λ-CaCO3) and vaterite (μ-$CaCO_3$).

The morphology and particle sizes of $CaCO_3$ nanomaterials capped with PAMPSA/VP and PAMPSA/MAA were determined by TEM and DLS that are represented in FIGS. 5A-5B and FIGS. 5C-5D, respectively. The presence of PAMPSA/VP (FIGS. 5A-5B) forms uniform porous $CaCO_3$ with particle sizes of 64.2 nm and polydispersity index (PDI) of 0.323. The capping of $CaCO_3$ with PAMPSA/MAA produced clusters with particle sizes of 272.8 nm and PDI 0.986 as polydisperse $CaCO_3$ particles. These data confirm that the particle sizes and monodisperse $CaCO_3$ depended on the concentration and types of PILs.

Surface charges of the $CaCO_3$ nanoparticles determined from zeta potential measurements as well as particle sizes were determined and are listed in Table 1. The data confirmed that the calcium carbonate negative charges stabilized with PIL based on PAMPSA/VP that produced dispersed particles in water when achieved zeta potential values more than positive or more negative values than 20 mV as represented in Table 1.

TABLE 1

Size and Zeta Potential of Nanoparticles Capped with PILs

| PIL | Reactants | Ratio PIL:nanoparticles | Nanoparticle Size (nm) | PDI | Zeta Potential (mV) |
|---|---|---|---|---|---|
| AMPSA/VP | $TiO_2$ | 2:1 | 43.0 | 0.326 | −16.4 |
| AMPSA/VP | $ZrO_2$ | 2:1 | 98.1 | 0.349 | −35.65 |
| AMPSA/VP | $CaCO_3$ | 2:1 | 151.1 | 0.415 | −13.99 |
| AMPSA/VP | $Cu_2\cdot Fe_3O_4$ | 2:1 | 239.0 | 1.289 | −18.4 |
| AMPSA/MAA | $TiO_2$ | 2:1 | 58.9 | 0.248 | −43.18 |
| AMPSA/MAA | $CaCO_3$ | 2:1 | 272.3 | 0.986 | −2272 |
| AMPSA/VP | $TiO_2$ | 1:1 | 30.7 | 0.203 | −50.73 |
| AMPSA/VP | $CaCO_3$ | 1:1 | 64.2 | 0.323 | −21.16 |

Example 8

Characterization of $Cu_2O.2Fe_3O_4$ Nanomaterials Capped With PILs

The mechanism for preparing the $Cu_2O.2Fe_3O_4$ in the presence of NaOH and $NH_2OH$ can be represented in the following equations:

$$6Fe^{3+}+SO_3^{2-}+O^{2-}\rightarrow SO_4^{2-}+2Fe^{2+}+4Fe^{3+} \qquad (1)$$

$$2Fe^{2+}+4Fe^{3+}+18OH^-\rightarrow 2Fe_3O_4+9H_2O \qquad (2)$$

$$2Cu^{2+}+NH_2OH\rightarrow 2Cu^++(NHOH)+2H^+ \qquad (3)$$

$$(NHOH)+\tfrac{1}{2}O_2\rightarrow NO_2^-+H^+ \qquad (4)$$

$$2Cu^++2OH^-\rightarrow Cu_2O+H_2O \qquad (5)$$

$$\begin{aligned}6FeCl_3+2CuCl_2+Na_2SO_3+23NaOH+NH_2OH+\\ \tfrac{1}{2}O_2\rightarrow Cu_2O.2Fe_3O_4+Na_2SO_4+NaNO_2+\\ 22NaCl+13H_2O\end{aligned} \qquad (6)$$

These equations represent the oxidation reduction reactions to convert the ferric chloride and cupric chloride salt to produce $Cu_2O.2Fe_3O_4$ composites.

One of the most important goals of the present work is to use PIL as reducing and capping agents to produce silver nanoparticles with controlled shape and size. For this purpose, VP is used as comonomer with AMPSA (see FIG. 1) to produce PIL, since it has great tendency to reduce metal ions to metal nanoparticles. Moreover the presence of DEEA in the chemical structure of AMPSA/VP will assist the reduction of ions to metal due to the presence of a hydroxyl group. In the present work, AMPSA/VP was used to produce $Cu_2O.2Fe_3O_4$ in a simple one-step method.

Figure 6A:
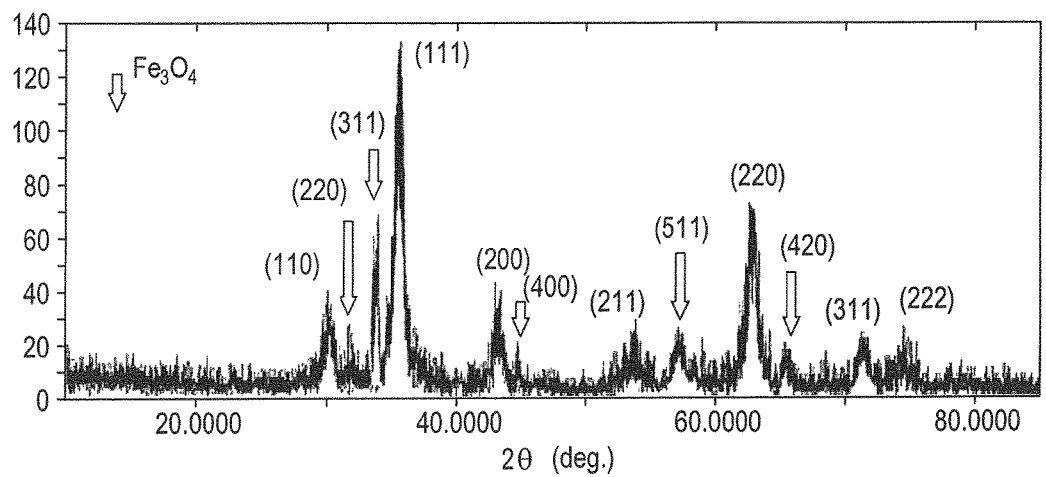
FIGS. 6A and 6B are XRD diffractograms of $Cu_2.Fe_3O_4$ nanoparticles capped with AMPSA/VP copolymer and $Cu_2.Fe_3O_4$ nanoparticles capped with AMPSA/MAA copolymer, respectively.
Figure 6B:
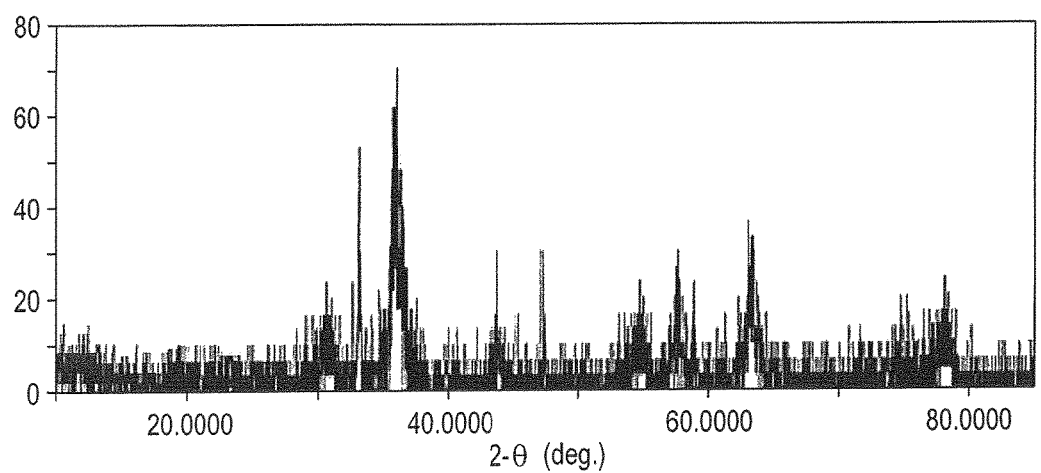
Figure 6C:
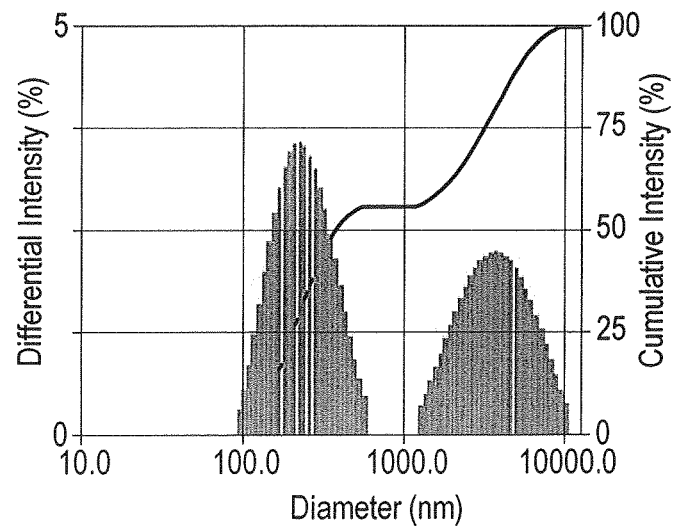
FIGS. 6C and 6D are dynamic light scattering (DLS) plots of particle size distribution of $Cu_2.Fe_3O_4$ nanoparticles capped with AMPSA/MAA copolymer and $Cu_2.Fe_3O_4$ nanoparticles capped with AMPSA/VP copolymer, respectively.
Figure 6D:
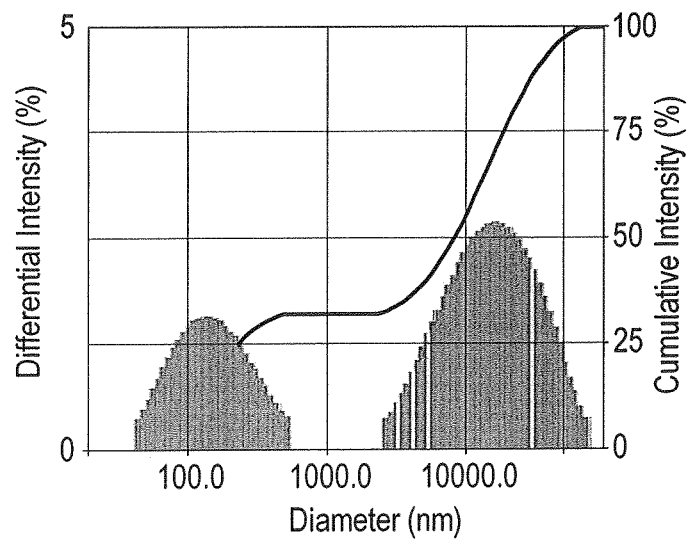

The crystal structure of $Cu_2O.2Fe_3O_4$ nanocomposites can be determined from XRD patterns as represented in FIGS. 6A and 6B. Seven major reflections, located at about 30.1°, 35.5°, 43.2°, 53.5°, 57.1°, 62.6° and 74.3°, as shown in FIGS. 6A-6B, can be assigned to diffraction of $Fe_3O_4$ nanoparticles with cubic-phase from the (220), (311), (400), (422), (511), (440) and (533) planes (JCPDS card no. 65-3107), respectively. The peaks at 2θ values of 36.5°, 42.4° and 61.4°, are clearly distinguishable and can be perfectly indexed rhombic dodecahedral crystals in the cubic-phase from the (1 1 0), (1 1 1), (2 0 0), (2 1 1), (2 2 0), (3 1 1) and (2 2 2) planes (JCPDS card no. 05-0667). These peaks correspond to the crystal planes of (111), (200) and (220) of the $Cu_2O$, respectively. These peaks suggest that $Cu_2O.2Fe_3O_4$ nanocomposites are formed. XRD pattern of the $Cu_2O.2Fe_3O_4$ nanocomposites reveals that the crystal structure of $Fe_3O_4$ is well-maintained after loading by $Cu_2O$ during the reaction process. It was clear that the intensity of the $Cu_2O$ peaks became gradually stronger with the presence of AMPSA/VP during the formation of $Cu_2O.2Fe_3O_4$ nanocomposites. On the other hand, it was notable that there was a slight positive shift for the diffraction peaks (3 1 1), (2 0 0), (5 1 1), (2 2 0), (3 1 1) at approximately 35.5, 43.2, 57.1, 61.5, 77.6, indicating that there was an interaction between $Cu_2O$ and $Fe_3O_4$. The low intensity and broadness of peaks for $Cu_2O.2Fe_3O_4$ nanocomposites prepared in the presence of AMPSA/MAA (FIG. 6B) elucidate the low particle sizes of $Cu_2O.2Fe_3O_4$ nanocomposites more than that prepared in the presence of AMPSA/VP (FIG. 6A).

The particle size of $Cu_2O.2Fe_3O_4$ PAMPSA/MAA and PAMPSA/VP forms polydispersity clusters with particle sizes of 2392 and 601 nm, respectively as represented in Table 1 and FIG. 5 a and b, respectively.

Example 9

Characterization of $TiO_2$ Nanomaterials Capped with PILs

The thermal hydrolysis of $TiCl_4$ in water is a highly exothermic reaction that produces more HCl that can be controlled in the present synthesis by using alcoholic solutions of PILs that have strong capability to form complexes with $TiCl_4$. In this synthesis, different types of alcohol, such as isopropanol, ethanol, and methanol were used to control the particle sizes, shape, dispersity and type of $TiO_2$ nanoparticles, such as anatase or rutile types. Moreover, the effect of PILS based on AMPSA/VP, AMPSA/NIPAm, AMPSA/MAA, or AMPSA/AM on the types and concentrations in the production of $TiO_2$ nanoparticles having controlled sizes and shapes also was investigated. It was previously reported that uncontrolled $TiO_2$ particle sizes that were produced from the thermal hydrolysis of $TiCl_4$ leads to irregular shapes with high polydispersity of the resulting particles in the absence of alcohol. Alcohols significantly affect the formation of nanocrystals. It was also proved that with an increase in water content, the average size of the nanocrystals decreased. In the present work, we have demonstrated a new methodology for preparing uniformly sized nanocrystals of the pure rutile-rich phase that have a well-controlled shape at controlled temperatures and solvent compositions. The proposed mechanism for formation of $TiO_2$ is based on the concentrations of HCl (1-10 mol/L). It was expected that at high concentration, HCl can serve as an acidic catalyst to control the hydrolysis speed of a titanium source to produce rutile $TiO_2$ phase. The reaction mechanism obeys the following equations:

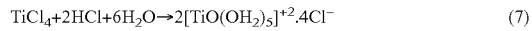

$$TiCl_4 + 2HCl + 6H_2O \rightarrow 2[TiO(OH_2)_5]^{+2}.4Cl^- \quad (7)$$

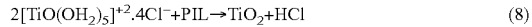

$$2[TiO(OH_2)_5]^{+2}.4Cl^- + PIL \rightarrow TiO_2 + HCl \quad (8)$$

The PIL can serve as a capping agent based on its strong interaction with the (110) facet of rutile. More specifically, we can demonstrate that the presence of VP in the chemical structure of AMPSA/VP favors the formation of rutile structure with a controlled shape due to the mutual stacking of VP rings.

Figure 7:
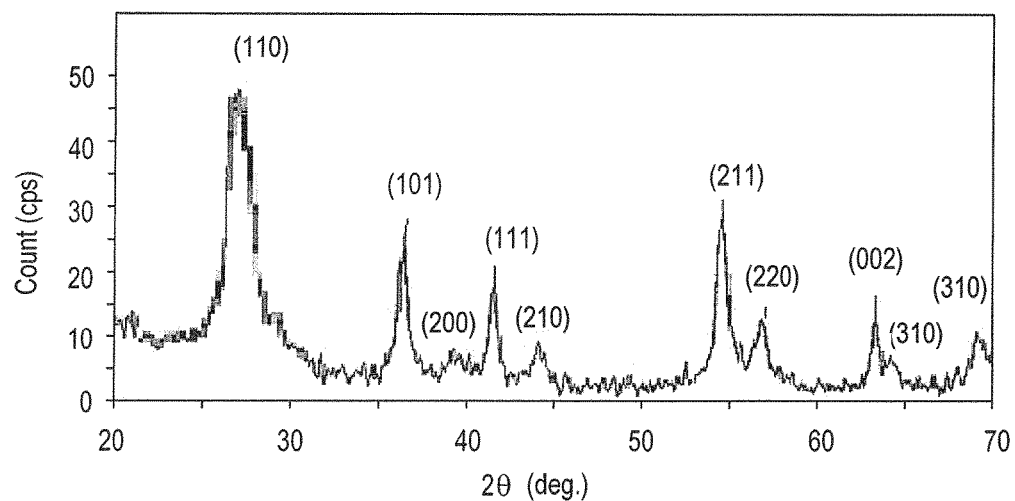
FIG. 7 is an x-ray diffractogram (XRD) of titanium dioxide ($TiO_2$) nanoparticles capped by 4 wt % AMPSA/VP copolymer.

The crystal structure of $TiO_2$ capped with PILs can be investigated using X-ray diffraction (XRD) pattern, as represented in FIG. 7. The diffraction peaks clearly confirm the formation of pure rutile.

Figure 8A:
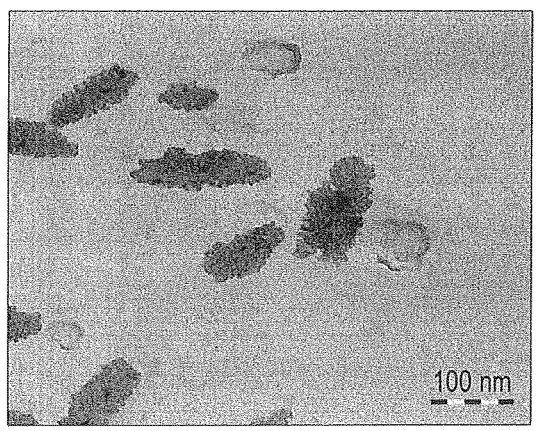
FIG. 8A is a TEM micrograph of $TiO_2$ nanoparticles uncapped by a PIL and FIGS. 8B, 8C, and 8D are TEM micrographs of $TiO_2$ nanoparticles capped by 1 wt %, 2 wt %, and 4 wt %, respectively, of AMPSA/VP copolymer.
Figure 8B:
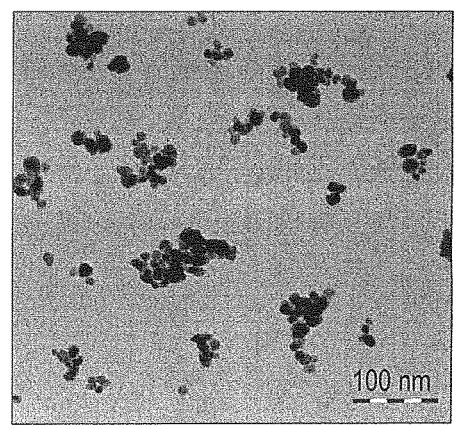
Figure 8C:
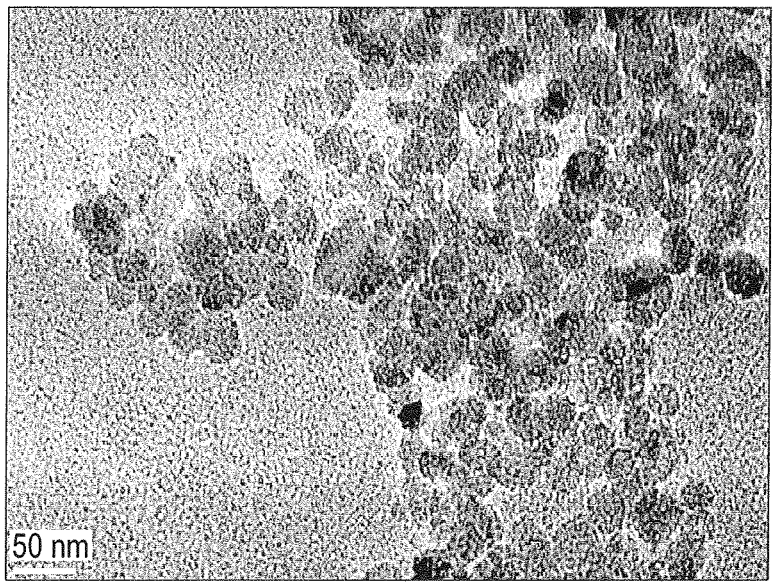
Figure 8D:
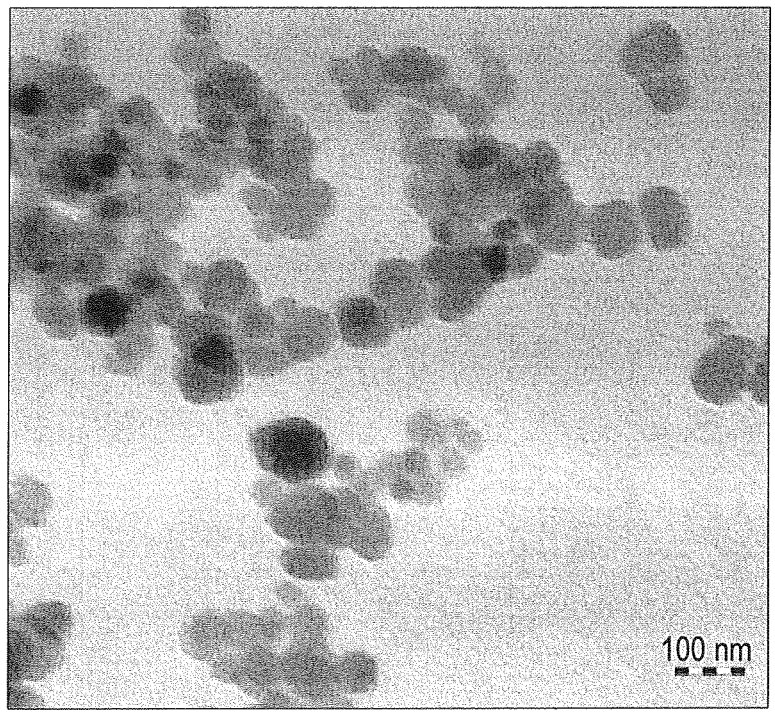
Figure 9A:
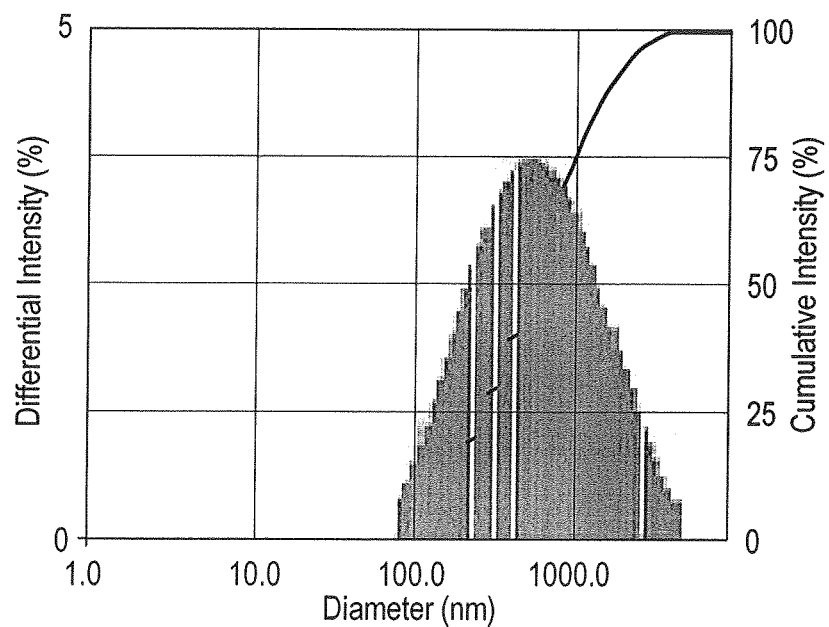
FIGS. 9A and 9B are dynamic light scattering (DLS) plots of particle size distribution of titanium dioxide ($TiO_2$) nanoparticles capped by 1 wt % and capped by 4 wt %, respectively, of AMPSA/VP copolymer.
Figure 9B:
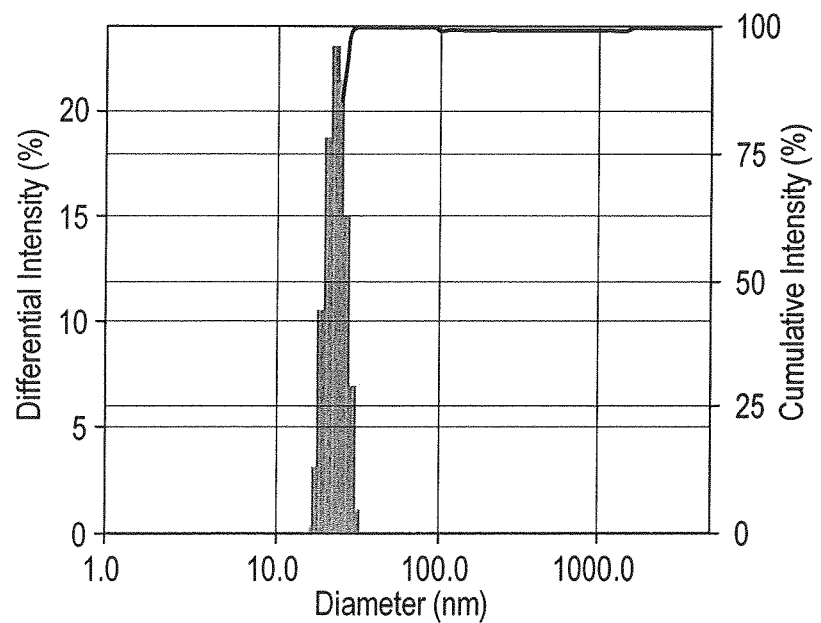
Figure 9C:
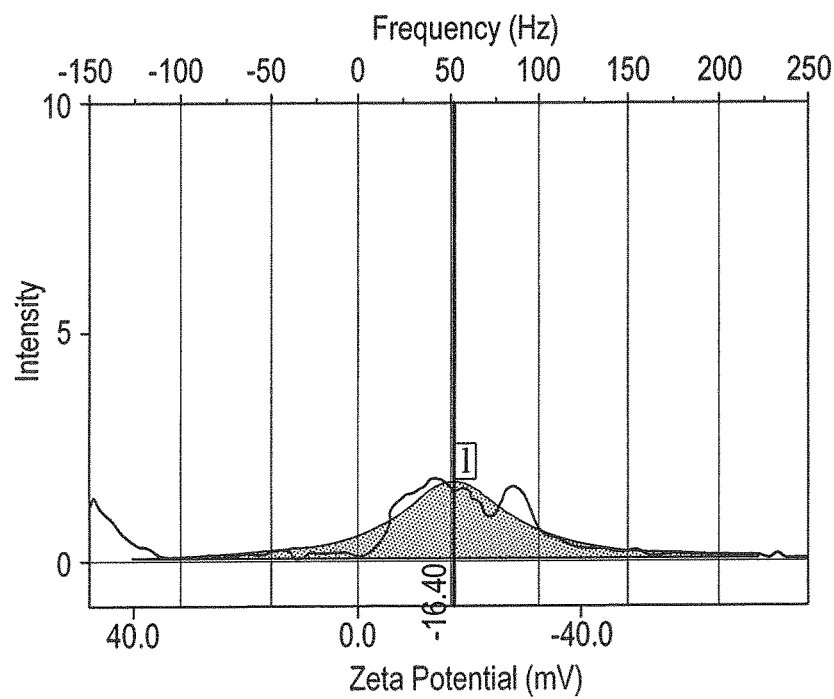
FIGS. 9C and 9D are plots of zeta potential of titanium dioxide ($TiO_2$) nanoparticles capped by AMPSA/VP copolymer and capped by AMPSA/MAA copolymer, respectively.
Figure 9D:
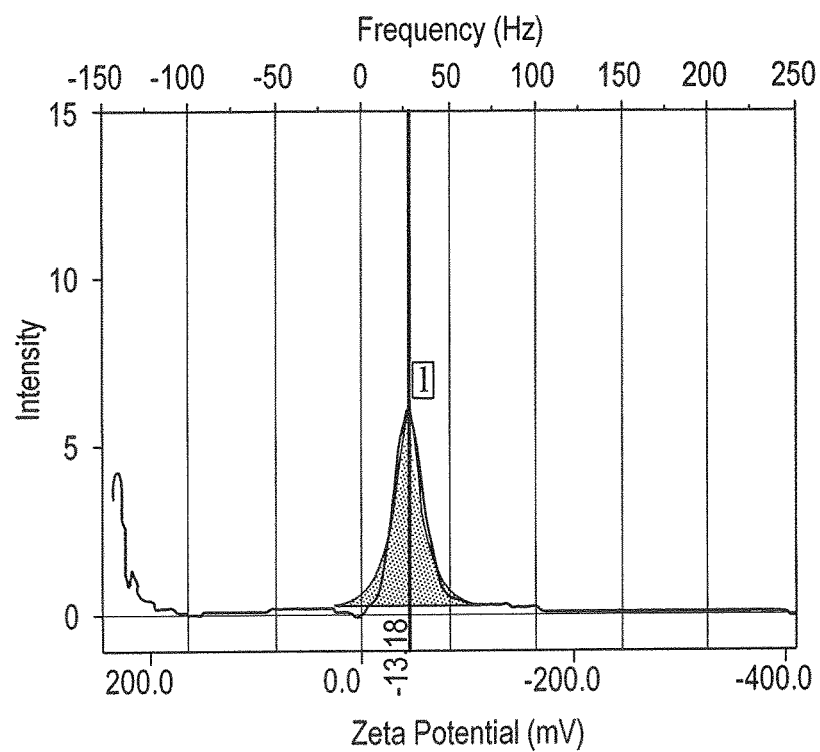

The morphologies of $TiO_2$ capped in the presence and in the absence of AMPSA/VP were analyzed by TEM and represented in FIGS. 8A-8D. The uncontrolled $TiO_2$ shapes were observed from FIG. 8A due to the absence of PIL. The presence of at least 1 wt % of AMPSA controlled the shapes of $TiO_2$ to be spherical and dispersed particles according the PIL contents (FIGS. 8B-8D).

The addition of PILs altered the morphology of the particles, resulting in clusters with smaller aspect ratios but greater uniformity of shape and size. The presence of both cations and anions in the chemical structures of PILs facilitate the interaction between the formed complex in equation 7 and PILs. It is well known that the $TiO_2$ surface has positive charge in acidic medium at pH=3.5 that facilitates the interaction and chemical adsorption of $TiO_2$ with negative networks, as represented in FIG. 2. Moreover, the formation of hydrogen bonds between $TiO_2$ surfaces and amide groups of VP facilitate controlling the sizes and shapes of the produced nanoparticles, as represented in FIGS. 8A-8D.

The particle sizes and surface charges of $TiO_2$ capped with AMPSA/VP were summarized in Table 1 above and represented in FIGS. 9A-9B and 9C-9D, respectively. The data confirmed that the particle sizes were reduced from 433 to 30.6 nm with increment in the PIL content. The zeta potential values also confirmed that the stability of $TiO_2$ dispersability in water increased with using AMPSA/MAA, as capping agents as represented in Table 1 and FIG. 9B.

Example 10

Characterization of $ZrO_2$ Nanomaterials Capped with PILs

Figure 10A:
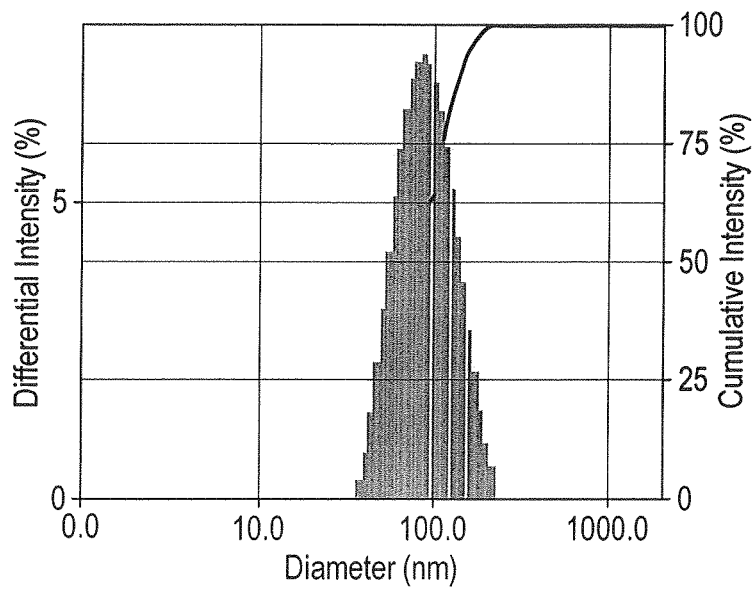
FIGS. 10A and 10B are a dynamic light scattering (DLS) plot of particle size distribution and a plot of zeta potential, respectively, of zirconium dioxide ($ZrO_2$) nanoparticles capped by 2 wt % of AMPSA/VP copolymer.
Figure 10B:
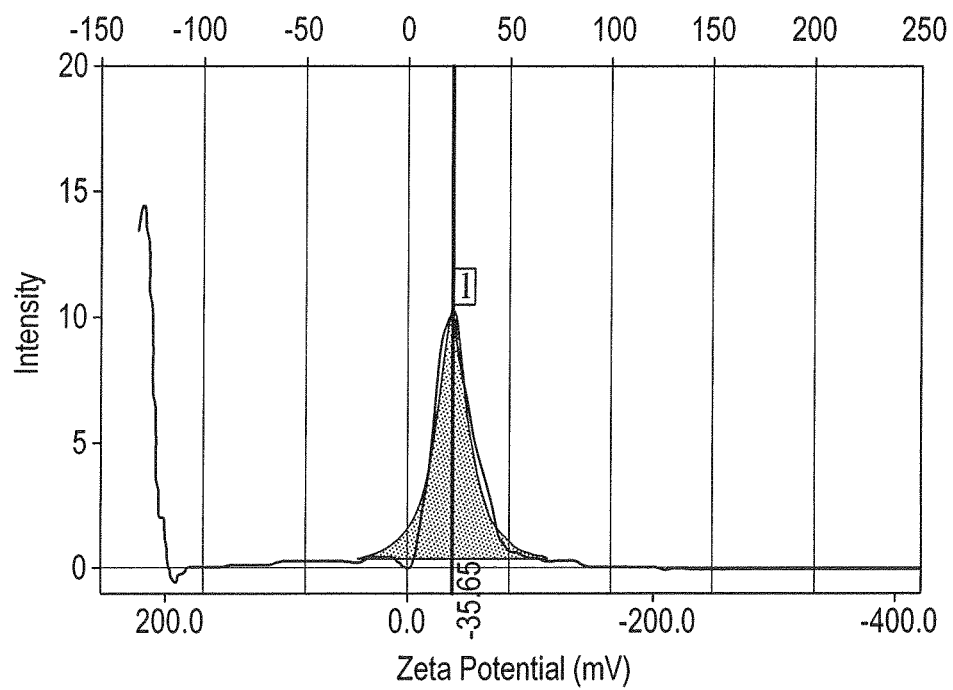

This type of nanomaterial is based on the preparation of $ZrO_2$ in the absence of PILs, followed by dispersion or physical capping with PIL as described in Example 5. The calcination of Zr oxides, produced from reaction of zirconium sulfate with benzyl alcohol and sodium lauryl sulfate, at 600° C. produced $ZrO_2$. Their surfaces can be capped with AMPSA/VP that contains more amide groups to control their dispersion in water. The particle sizes of $ZrO_2$ capped with 2 wt % of AMPSA/VP (FIG. 10A) is 98.8 nm and its zeta potential (FIG. 10B) is −33.85 mV. These data confirm the formation of stabilized $ZrO_2$ nanoparticles using AMPSA/VP PIL as capping agents.

Example 11

Figure 11A:
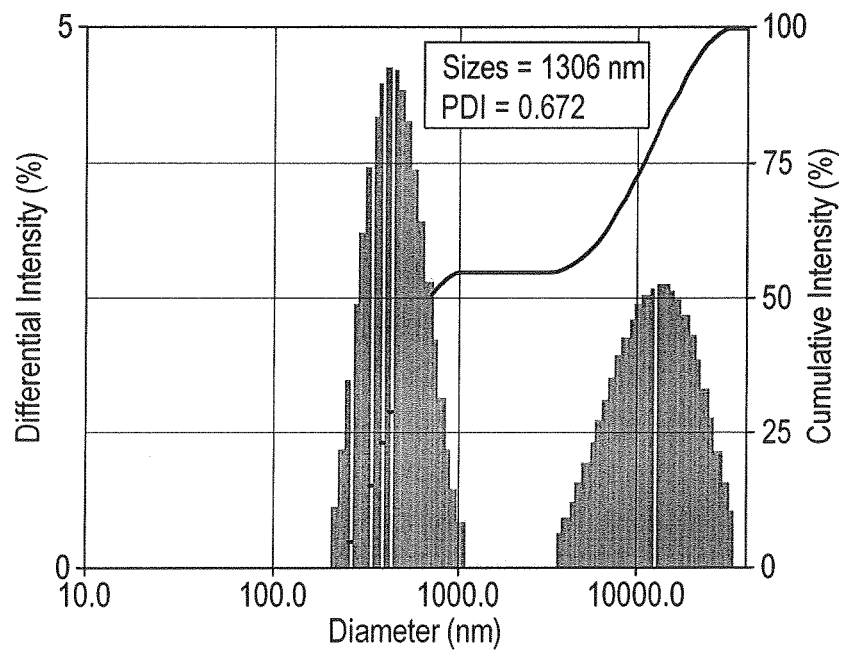
FIGS. 11A, 11B, 11C, and 11D are dynamic light scattering (DLS) plots of particle size distribution of crushed limestone in seawater, $CaCO_3$ nanoparticles capped with AMPSA/VP copolymer, $TiO_2$ nanoparticles capped with AMPSA/VP copolymer, and $ZrO_2$ nanoparticles capped with AMPSA/VP copolymer, respectively, at 25° C.
Figure 11B:
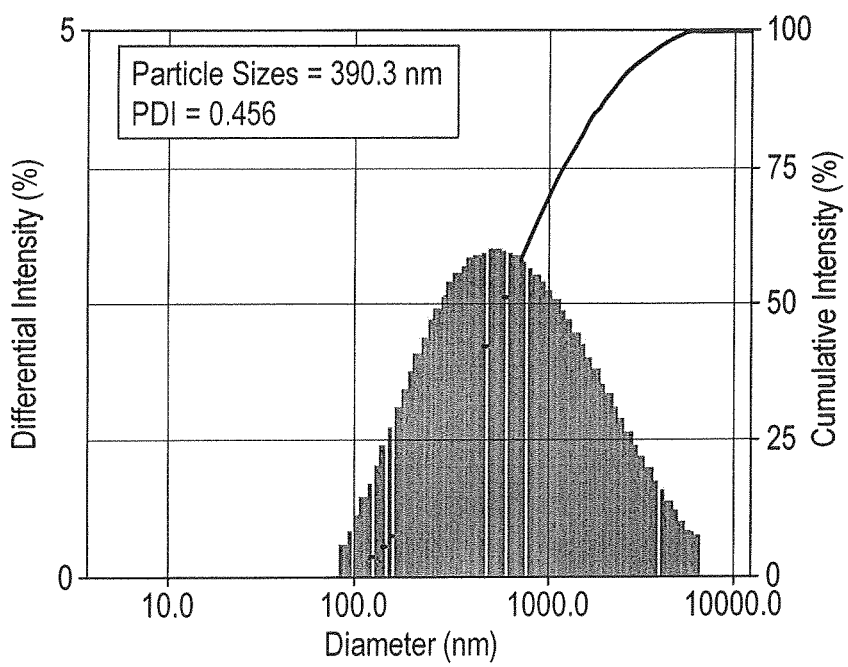
Figure 11C:
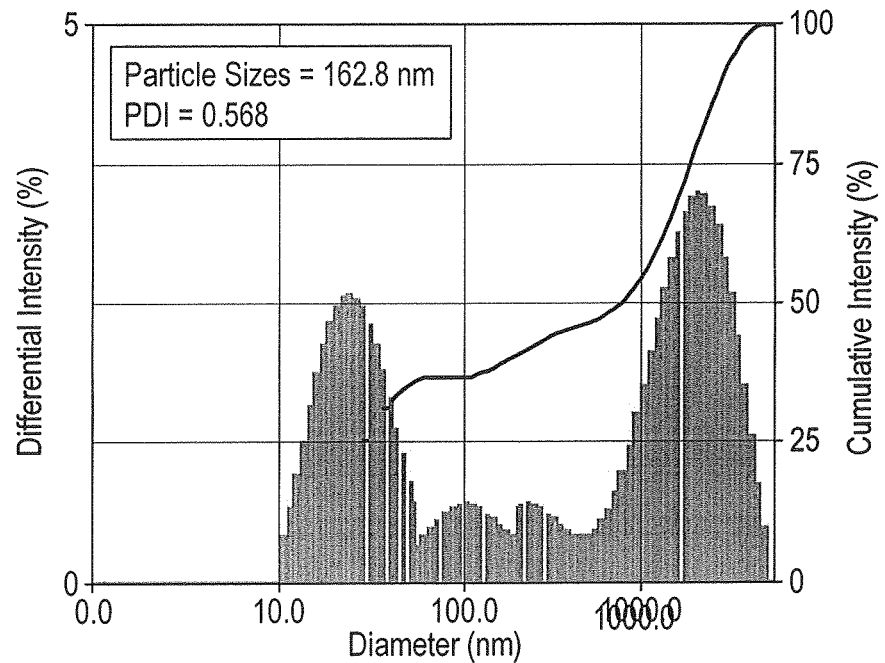
Figure 11D:
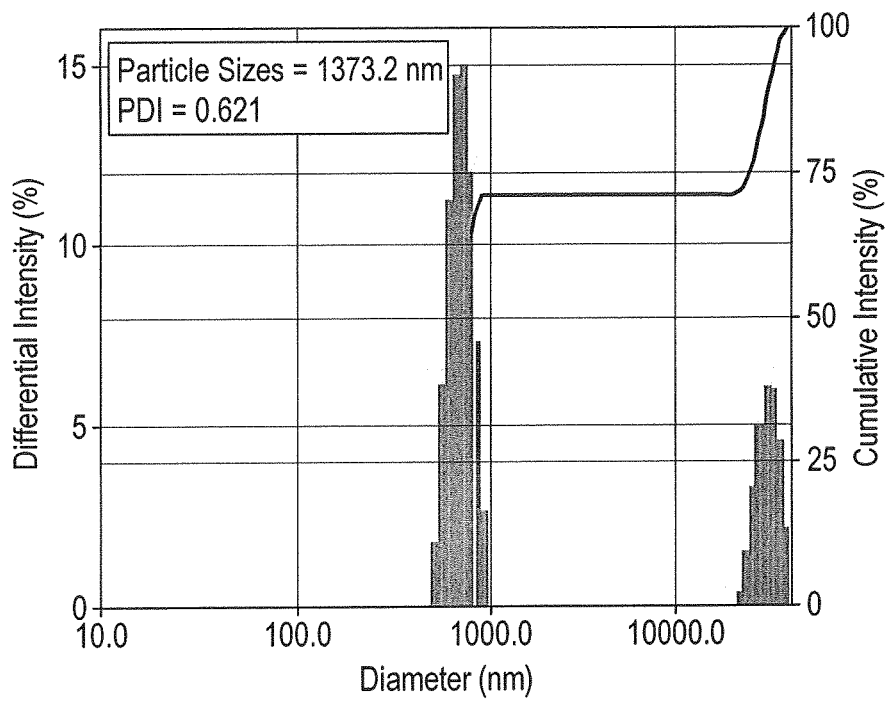

Wettability and Dispersability of Nanomaterials in Limestone Rock for EOR Application The interactions of the seawater and the present prepared nanomaterials capped with PILs in aqueous solutions, all at 3000 mg/L concentration, with the crushed limestone powder were determined using DLS technique and represented in FIGS. 11A-11D. FIG. 11A confirms that seawater cannot easily disperse the crushed powder of limestone and forming agglomerate with particle sizes of 1306 nm and polydispersity index (PDI) of 0.672. The interaction of $CaCO_3$ capped with AMPSA/VP solution (FIG. 11B) indicates the covering of all particle sizes ranged from 100 nm to 10 μm with a PDI value of 0.456. This can be attributed to the good interaction between $CaCO_3$ and limestone calcite. The same data was observed with $TiO_2$ capped with AMPSA/VP (FIG. 11C), but with a narrower particle size range of 162.8 nm. The interaction of $ZrO_2$ capped with AMPSA/VP with limestone particles (FIG. 11D) indicates a behavior similar to that of seawater, with particle sizes in the range of 1373.2 nm and PDI of 0.621.

Figure 12A:
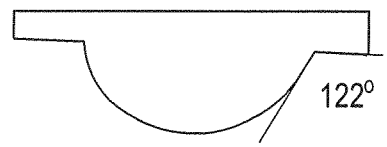
FIGS. 12A, 12B, and 12C are schematic diagrams graphically representing the contact angle of an oil droplet with a limestone surface in the presence of seawater, in the presence of 5000 ppm of an AMPSA/MAA copolymer, and in the presence of 5000 ppm of an AMPSA/VP copolymer, respectively.
Figure 12B:
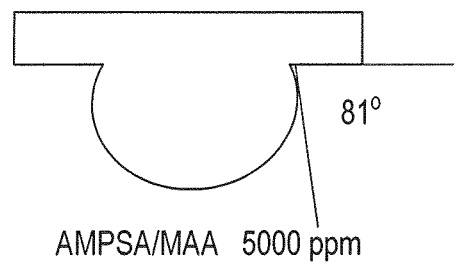
Figure 12C:
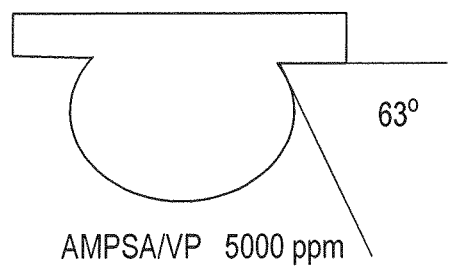
Figure 13A:
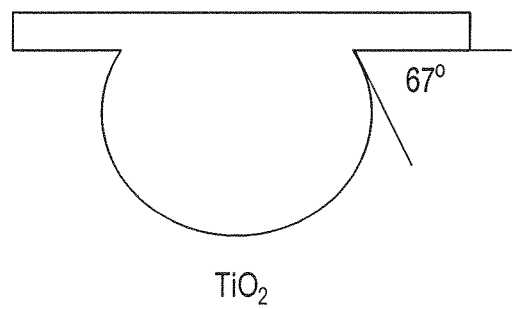
FIGS. 13A, 13B, and 13C are schematic diagrams graphically representing the contact angle of an oil droplet with a limestone surface in the presence of 5000 ppm of $TiO_2$ nanoparticles capped with an AMPSA/MAA copolymer, in the presence of 5000 ppm of CaCO3 nanoparticles capped with an AMPSA/MAA copolymer, and in the presence of 5000 ppm of $ZrO_2$ nanoparticles capped with an AMPSA/MAA copolymer, respectively, at 65° C.
Figure 13B:
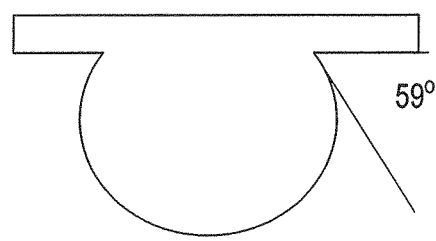
Figure 13C:
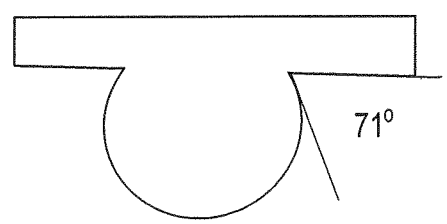
Figure 14A:
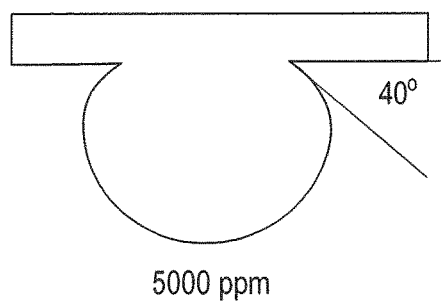
FIGS. 14A, 14B, 14C, and 14D are schematic diagrams graphically representing the contact angle of an oil droplet with a limestone surface in the presence of $TiO_2$ nanoparticles capped with an AMPSA/VP copolymer at concentrations of 5000 ppm, 2500 ppm, 1500 ppm, and 500 ppm, respectively, at 65° C.
Figure 14B:
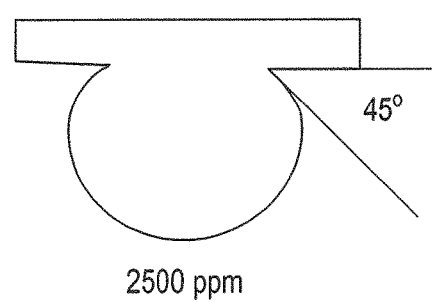
Figure 14C:
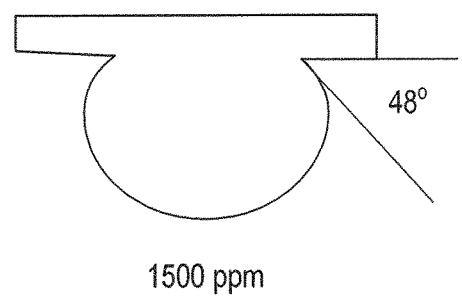
Figure 14D:
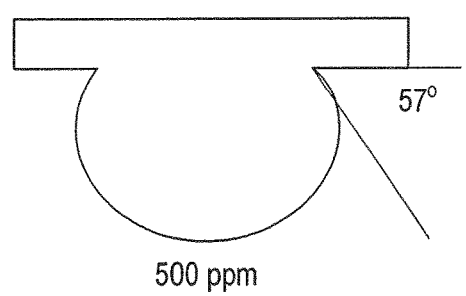

To investigate the prepared PILs effectiveness in altering the limestone wettability, contact angle measurements were conducted at 65° C. FIGS. 12A and 12B-12C summarize the contact angle measurements of crude oil drop on substrates representing the limestone soaked in solutions of sea water and PILs having concentrations of 5000 ppm, respectively.

The rock showed slightly oil wet characteristics in the presence of seawater with a contact angle around 122°. This can be related to the presence of divalent cations in seawater, resulting in more positive charges on rock pore surfaces, making it attractive to crude negative end polar components and resulting in a wettability shift away from water-wet characteristics. As different PILs are added at different concentrations, wettability tends to shift gradually as concentration increases. Wettability showed a drastic shift at maximum concentration of 5000 ppm towards preferentially water wet state. PIL based on AMPSA/VP improved the wetting characteristics of limestone and achieved contact angles of 63°. It is interesting to mention that the lower contact angle obtained in the presence of AMPSA/VP is referred to its adsorption through replacement of positive charges of quaternary amine of DEA with the cations of limestone to increase the interaction of PIL negative charges with seawater. These interactions change the rock surface to a more hydrophilic state, releasing the crude oil from the rock surface.

The contact angles measurements for different concentrations of $TiO_2$ capped with AMPSA/VP are represented in FIGS. 13A-13C and 14A-14D.

The data confirm that the lowest contact angles were achieved with $TiO_2$, due to its high dispersion in sea water that facilitates its interaction with limestone and reduces its wettability to be 40° at 5000 ppm. Consequently, the strong interactions between positive cations of PIL and rock surfaces help to alter its wettability and facilitate the diffusion of nanomaterials capped with PIL inside the rock pores, replacing the oil.

It is to be understood that the present invention is not limited to the embodiments described above, but encompasses any and all embodiments within the scope of the following claims.

We claim:

1. A composition for enhanced oil recovery, comprising:
   metal oxide or carbonate nanoparticles selected from the group consisting of $CaCO_3$, $TiO_2$, $Cu_2O.Fe_3O_4$, or $ZrO_2$; and
   a water soluble poly(ionic liquid) (PIL) encapsulating the nanoparticles wherein said water soluble poly(ionic liquid) is a copolymer of 2-acrylamido-2-methyl-1-propanesulfonic acid (AMPS) with another monomer selected from the group consisting of N-isopropyl acrylamide, N-vinyl pyrrolidone, methacrylic acid or acrylamide.

2. The composition for enhanced oil recovery according to claim 1, wherein said PIL-encapsulated nanoparticles have a particle size less than one micron.

3. The composition for enhanced oil recovery according to claim 1, wherein said nanoparticles comprise nanoparticles of calcium carbonate.

4. The composition for enhanced oil recovery according to claim 1, wherein said nanoparticles comprise nanoparticles of titanium dioxide.

5. The composition for enhanced oil recovery according to claim 1, wherein said nanoparticles comprise nanoparticles of zirconium dioxide.

6. The composition for enhanced oil recovery according to claim 1, wherein said nanoparticles comprise nanoparticles of a $Cu_2O.Fe_3O_4$ composite.

7. The composition for enhanced oil recovery according to claim 1, wherein said nanoparticles comprise nanoparticles of calcium carbonate and said poly(ionic liquid) (PIL) comprises a copolymer of 2-acrylamido-2-methyl-1-propanesulfonic acid (AMPS) and N-vinyl pyrrolidone.

8. The composition for enhanced oil recovery according to claim 1, wherein said nanoparticles comprise nanoparticles of calcium carbonate and said poly(ionic liquid) (PIL) comprises a copolymer of 2-acrylamido-2-methyl-1-propanesulfonic acid (AMPS) and methacrylic acid.

9. The composition for enhanced oil recovery according to claim 1, wherein said nanoparticles comprise nanoparticles of titanium dioxide and said poly(ionic liquid) (PIL) comprises a copolymer of 2-acrylamido-2-methyl-1-propanesulfonic acid (AMPS) and N-vinyl pyrrolidone.

10. The composition for enhanced oil recovery according to claim 1, wherein said nanoparticles comprise nanoparticles of titanium dioxide and said poly(ionic liquid) (PIL) comprises a copolymer of 2-acrylamido-2-methyl-1-propanesulfonic acid (AMPS) and methacrylic acid.

11. A method for enhanced oil recovery from an oil reservoir, comprising the step of adding the composition according to claim 1 to a fluid injected into the oil reservoir as a surfactant in order to improve wettability of the reservoir.

12. The method for enhanced oil recovery from an oil reservoir according to claim 11, wherein the reservoir is a carbonate reservoir.

13. The method for enhanced oil recovery from an oil reservoir according to claim 11, wherein the fluid is water.

* * * * *